US007706675B2

(12) United States Patent
Nozaki et al.

(10) Patent No.: US 7,706,675 B2
(45) Date of Patent: Apr. 27, 2010

(54) CAMERA

(75) Inventors: Hirotake Nozaki, Port Washington, NY (US); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 252 days.

(21) Appl. No.: 11/783,583

(22) Filed: Apr. 10, 2007

(65) Prior Publication Data
US 2007/0242942 A1  Oct. 18, 2007

(30) Foreign Application Priority Data
Apr. 14, 2006  (JP) .............................. 2006-112308

(51) Int. Cl.
G03B 3/10 (2006.01)
G03B 41/00 (2006.01)
G03B 13/00 (2006.01)

(52) U.S. Cl. .................. 396/123; 396/14; 348/345
(58) Field of Classification Search ............ 396/14, 396/18, 121–123; 348/345
See application file for complete search history.

(56) References Cited

U.S. PATENT DOCUMENTS

| 6,157,782 A * | 12/2000 | Aoyama ............ 396/104 |
| 6,163,653 A * | 12/2000 | Sato ................. 396/121 |
| 6,456,788 B1 * | 9/2002 | Otani ................ 396/51 |
| 6,670,992 B2 * | 12/2003 | Irie .................. 348/350 |
| 7,298,412 B2 * | 11/2007 | Sannoh et al. ....... 348/348 |
| 2005/0179780 A1 * | 8/2005 | Kikkawa et al. .... 348/207.99 |
| 2005/0220347 A1 * | 10/2005 | Enomoto et al. ..... 382/190 |
| 2006/0182433 A1 * | 8/2006 | Kawahara et al. .... 396/123 |
| 2007/0160359 A1 * | 7/2007 | Imamura ............ 396/238 |

FOREIGN PATENT DOCUMENTS

| JP | A 8-63597 | 3/1996 |
| JP | A 2001-16573 | 1/2001 |
| JP | A 2005-86682 | 3/2005 |

* cited by examiner

*Primary Examiner*—W. B. Perkey
*Assistant Examiner*—Dennis Hancock
(74) *Attorney, Agent, or Firm*—Oliff & Berridge, PLC

(57) ABSTRACT

A camera is provided with a face detecting section, a focusing section, an area specifying section, and a controlling section. The face detecting section detects a face area within a shooting image plane. The focusing section has plural optional areas within the shooting image plane. Further, the focusing section obtains an image phase difference amount of a pair of images based on luminous flux having passed through a shooting lens in each of the optional areas. The area specifying section specifies a focusing area from among the optional areas corresponding to the face area. Further, the area specifying section changes a method of specifying the focusing area in accordance with the size of the face area. The controlling section performs a focusing operation of the shooting lens on the basis of the image phase difference amount in the focusing area.

9 Claims, 7 Drawing Sheets

CAMERA

CROSS REFERENCE TO RELATED APPLICATION

This application is based upon and claims the benefit of priority from Japanese Patent Application No. 2006-112308, filed on Apr. 14, 2006, the entire contents of which are incorporated herein by reference.

BACKGROUND OF THE INVENTION

1. Field of the Invention

The present invention relates to a camera that performs focusing control on the basis of the result of face detection.

2. Description of the Related Art

As shown in Japanese Unexamined Patent Application Publication No. 2005-86682, for example, a camera that performs automatic focusing control (AF) by detecting the face of a subject within a shooting image plane is publicly known conventionally. In particular, in these years, it is also examined to enable a monocular reflex type camera to perform AF that is accompanied with face detection processing.

Meanwhile, in case where AF that is accompanied with face detection is performed mainly for a monocular reflex type camera, following problem has been pointed out. Generally, adoption of focus detector according to a phase difference detecting method is probably preferred from the viewpoint of performing a high speed AF. However, since the focus detector of a phase difference detecting method forms an image on a sensor after dividing luminous flux from a subject with a separator lens etc., there is room for improvement in the point that the constitution thereof is unsuitable for face detection processing.

In addition, when performing AF based on the face detection, it is desired to change a method of selecting a focusing area in accordance with the detection state of the face on a shooting image plane. For a focus detector of a phase difference detecting method, in particular, the necessity is large because there is a great restriction on the arrangement of the focusing area. However, Japanese Unexamined Patent Application Publication No. 2005-86682 does not disclose a means for solving the problem.

SUMMARY OF THE INVENTION

The present invention is one for solving the above-described problem of prior art. An object of the present invention is to provide a means capable of performing AF according to the phase difference detecting method on the basis of the result of the face detection and selecting the optimum focusing area in accordance with the detection state of the face for every scene to be shot.

A camera according to a first aspect of the present invention is provided with a face detecting section, a focusing section, an area specifying section and a controlling section. The face detecting section detects a face area within a shooting image plane. The focusing section has plural optional areas within the shooting image plane. Further, the focusing section obtains the image phase difference amount of a pair of images based on luminous flux having passed through a shooting lens in each of the optional areas. The area specifying section specifies a focusing area from among optional areas corresponding to the face area. Further, the area specifying section changes a method of specifying the focusing area in accordance with the size of the face area. The controlling section performs a focusing operation of the shooting lens on the basis of the image phase difference amount in the focusing area.

In the first aspect, in case where the size of a face area is not less than a threshold value, the area specifying section specifies preferably the optional area corresponding to the position of an eye in the face area as the focusing area.

In the first aspect, in case where the size of a face area is less than the threshold value, preferably the area specifying section groups one or more optional areas corresponding to the face area and specifies the focusing area from among the grouped optional areas.

The camera according to a second aspect of the present invention is provided with a face detecting section, a focusing section, an area specifying section and a controlling section. The face detecting section detects a face area within a shooting image plane. The focusing section includes a first area arranged with plural optional areas, and a second area having a lower arrangement density of optional areas than the first area, within the shooting image plane. Further, the focusing section obtains an image phase difference amount of a pair of images based on the luminous flux having passed through a shooting lens in respective optional areas. The area specifying section specifies a focusing area from among optional areas corresponding to the face area. Further, the area specifying section changes a method of specifying the focusing area depending on to which one of the first area and the second area the face area belongs. The controlling section performs the focusing operation of the shooting lens on the basis of the image phase difference amount in the focusing area.

In the second aspect, the area specifying section, when determining that the face area belongs to the first area, preferably specifies the optional area corresponding to the position of an eye of the face area in the first area as the focusing area.

In the second aspect, the area specifying section, when determining that the face area belongs to the second area, preferably groups one or more optional areas corresponding to the face area in the second area and specifies the focusing area from among the grouped optional areas.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Description of First Embodiment

Figure 1:
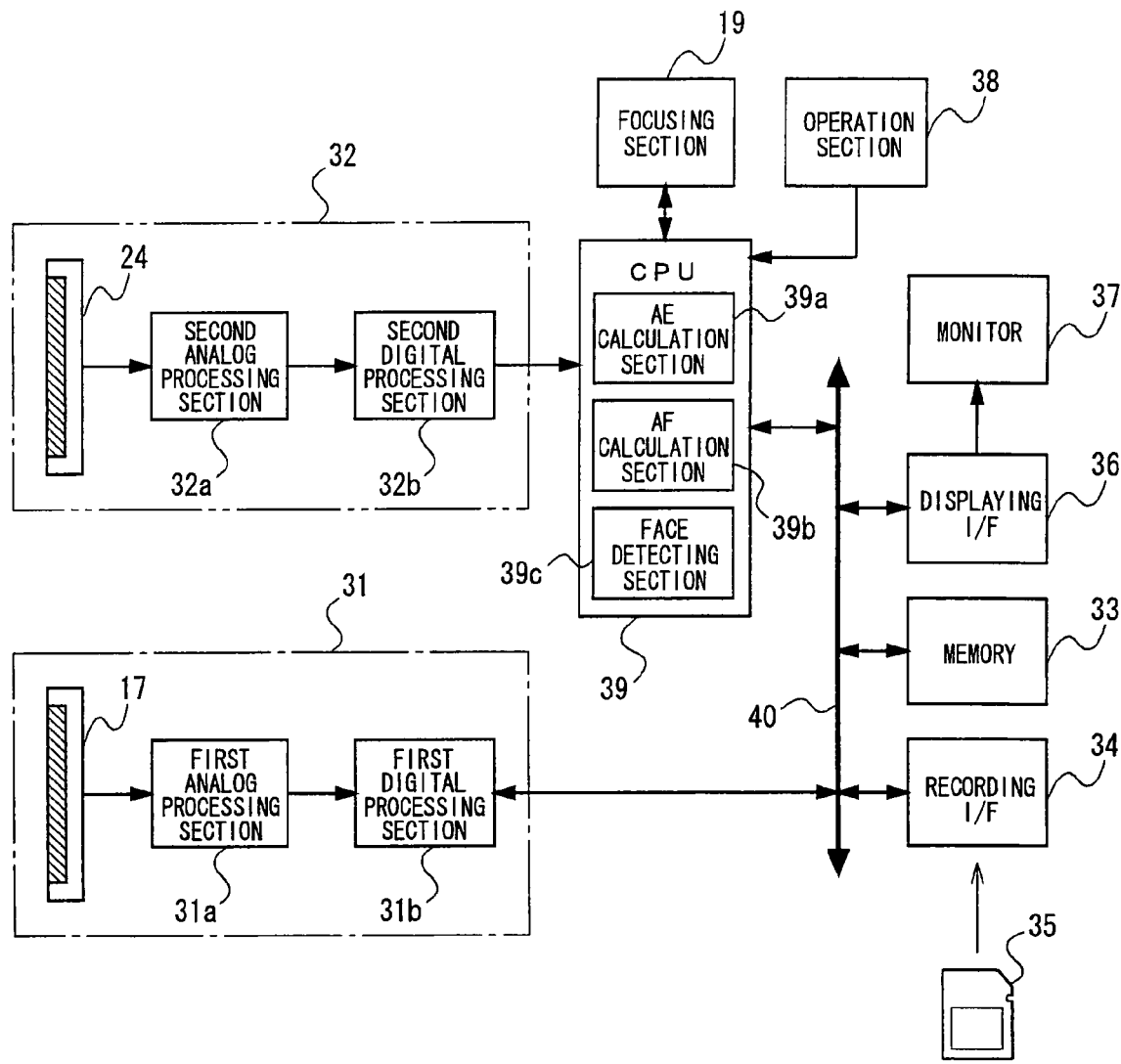
FIG. 1 is a block diagram showing a configuration of an electronic camera according to a first embodiment.
Figure 2:
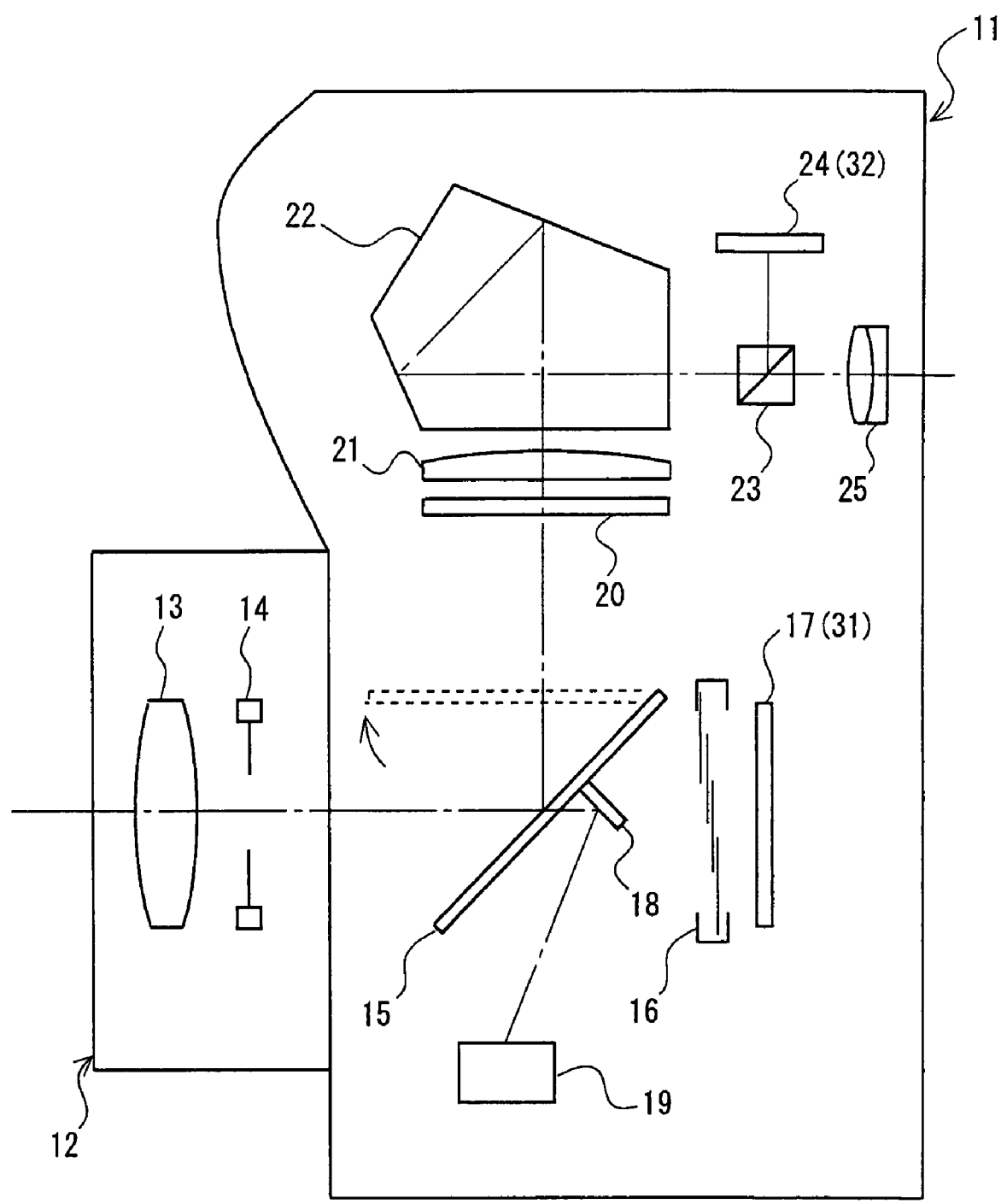
FIG. 2 is an outline view showing a shooting mechanism of the electronic camera according to the first embodiment.

FIG. 1 is a block diagram showing the configuration of an electronic camera according to the first embodiment. FIG. 2 is an outline view showing a shooting mechanism of the electronic camera according to the first embodiment.

Firstly, with reference to FIG. 2, the shooting mechanism of the electronic camera is described. The electronic camera of the first embodiment has a camera body 11, and a lens unit 12 housing a shooting optical system.

Here, the camera body 11 and the lens unit 12 are provided with a pair of mounts (not shown), respectively, having a male-female relation. The lens unit 12 is connected exchangeably to the camera body 11 by coupling the mounts with a bayonet mechanism or the like. Each of the mounts is provided with an electric contact. During the connection between the camera body 11 and the lens unit 12, the electric connection between the both is established through the contact between the electric contacts.

The lens unit 12 has a focusing lens 13 for adjusting a focusing position, and an aperture 14. The focusing lens 13 is configured so that it can be moved in the optical axis direction with a not shown motor. The aperture 14 adjusts the incident light quantity to the camera body 11 by opening or closing the diaphragm blades.

The camera body 11 has a main mirror 15, a mechanical shutter 16, a first image pickup device 17, a sub mirror 18, a focusing section 19, and a viewfinder optical system (20 to 25). The main mirror 15, the mechanical shutter 16 and the first image pickup device 17 are arranged along the optical axis of the shooting optical system. Behind the main mirror 15, the sub mirror 18 is arranged. In the upper area of the camera body 11, the viewfinder optical system is arranged. In the lower area of the camera body 11, the focusing section 19 is arranged.

The main mirror 15 is pivoted turnably with a not shown turning shaft so that it can be changed between an observing state and a retreating state. The main mirror 15 in the observing state is arranged in an inclined state in front of the mechanical shutter 16 and the first image pickup device 17. The main mirror 15 in the observing state reflects upward the luminous flux having passed through the shooting optical system to guide it to the viewfinder optical system. The central portion of the main mirror 15 is a half mirror. Then, a part of the luminous flux having passed through the main mirror 15 is deflected downward by the sub mirror 18 and guided to the focusing section 19. On the other hand, the main mirror 15 in the retreating state as well as the sub mirror 18 is driven upward to be in a position off the shooting optical path. When the main mirror 15 is in the retreating state, the luminous flux having passed through the shooting optical system is guided to the mechanical shutter 16 and the first image pickup device 17.

The viewfinder optical system has a diffusing screen (focusing plate) 20, a condensing lens 21, a pentagonal prism 22, a beam splitter 23, a second image pickup device 24, and an eyepiece lens 25. The diffusing screen 20 lies above the main mirror 15, and forms once the image of the luminous flux having been reflected from the main mirror 15 in the observing state. The luminous flux having formed the image on the diffusing screen 20 passes through the condensing lens 21 and the pentagonal prism 22. Then, the luminous flux is guided from an emitting surface, which has an angle of 90° relative to the incident surface of the pentagonal prism 22, to the beam splitter 23. The beam splitter 23 divides the incident luminous flux into fluxes in two directions. One luminous flux that passes through the beam splitter 23 is guided to the second image pickup device 24 via a secondary imaging lens (not shown), while the other luminous flux that passes through the beam splitter 23 reaches the eye of a user via the eyepiece lens 25.

Next, with reference to FIG. 1, the circuit configuration of the electronic camera is described. The camera body 11 has a focusing section 19, a recording-purpose imaging section 31, an analyzing-purpose imaging section 32, a memory 33, a recording I/F 34, a displaying I/F 36, a monitor 37, an operation section 38, a CPU 39 and a system bus 40. Here, the recording-purpose imaging section 31, the memory 33, the recording I/F 34, the displaying I/F 36 and the CPU 39 are connected via the system bus 40. In FIG. 1, the representation of the input and output from the CPU 39 to the lens unit 12 side is omitted.

Figure 3:
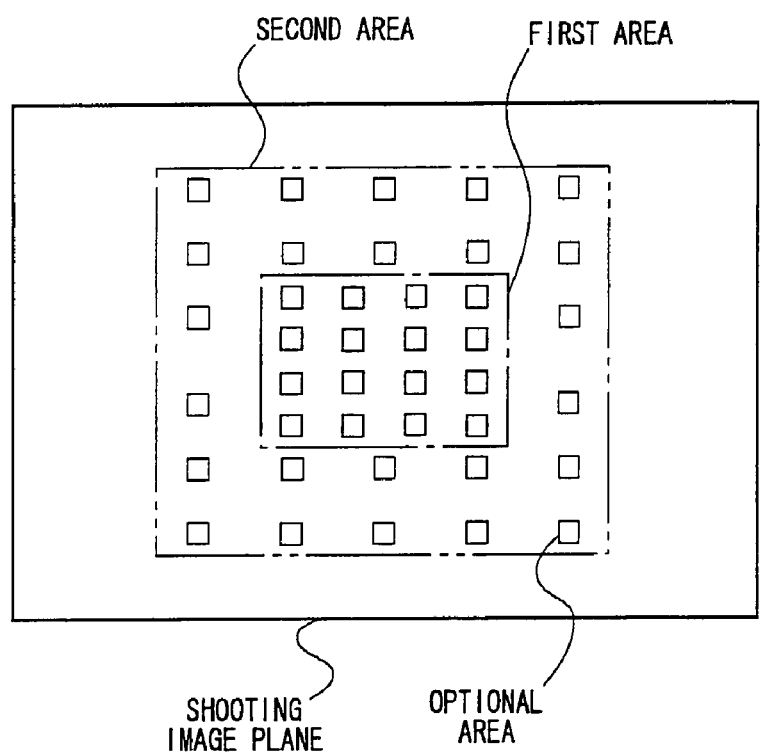
FIG. 3 is a drawing showing an arrangement of optional areas within a shooting image plane.

The focusing section 19 detects a focusing state in the optional area having been set previously within the shooting image plane. In the first embodiment, the focusing section 19 has 40 optional areas within the shooting image plane. FIG. 3 shows an example of arrangement of optional areas in the first embodiment. In the focusing section 19 of the first embodiment, each of the optional areas belongs to either the first area or the second area. The first area and the second area are set to have different arrangement densities of optional areas with each other.

Here, the first area corresponds to the central portion of the shooting image plane. In the first area, 16 optional areas are arranged intensively in a 4×4 lattice-like pattern. On the other hand, the second area lies on the outer circumference side of the first area. For the second area, 24 optional areas are arranged. Since, usually, there is a greater chance of performing the shooting while arranging a main subject at the center of a shooting image plane, the arrangement density of the optional areas in the second area is set lower than that of the optional areas in the first area. Incidentally, in the first embodiment, the first area and the second area as shown in FIG. 3 correspond to the focusing range (a range in which the calculation of the defocus amount is possible in any of optional areas within the shooting image plane) of the focusing section 19.

Figure 4:
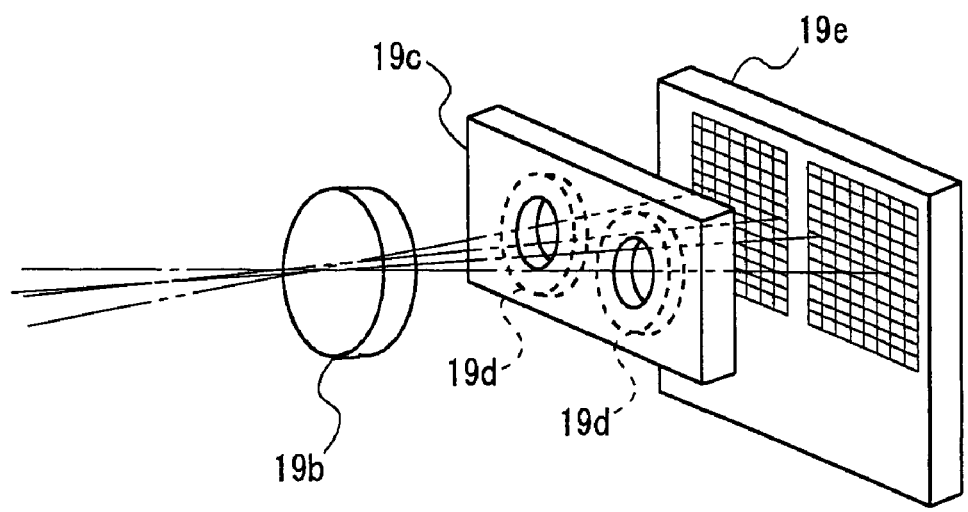
FIG. 4 is a schematic view showing the outline of an optical system of a focusing section according to the first embodiment.

The outline of the optical system of the focusing section 19 of the first embodiment is shown in FIG. 4. In FIG. 4, a focusing optical system corresponding to one optional area alone is shown schematically and a drawing of the entire focusing optical system is omitted. The focusing optical system of the focusing section 19 has a condensing lens 19b, an aperture mask 19c, a separator lens 19d and a line sensor 19e. The focusing optical system divides the luminous flux from a subject with the condensing lens 19b and the separator lens 19d, and detects the image phase difference amount of the subject image from the distance of two images with the line sensor 19e corresponding to respective optional areas.

The recording-purpose imaging section 31 has a first image pickup device 17, a first analog processing section 31a and a first digital processing section 31b.

The first image pickup device 17 is a sensor for generating a shooting image for recording. The first image pickup device 17 performs the photoelectric conversion of the subject image formed after passing through the shooting optical system at release, to generate analog signals of a shooting image. The output signal of the first image pickup device 17 is input to the first analog processing section 31a.

The first analog processing section 31a is an analog front-end circuit having a CDS circuit, a gain circuit, an A/D conversion circuit etc. The CDS circuit reduces the noise component of the output of the first image pickup device 17 through the correlated double sampling. The gain circuit amplifies and outputs the gain of an input signal. The gain circuit can adjust the image pickup sensitivity equivalent to the ISO sensitivity. The A/D conversion circuit performs the A/D conversion of the output signal from the first image pickup device 17. In FIG. 1, the representation of each circuit of the first analog processing section 31a is omitted.

The first digital processing section 31b performs various types of image processing (correction of defective pixels, color interpolation processing, tone conversion processing, white balance adjustment, edge emphasis, etc) for the output signal from the first analog processing section 31a, to generate the data of the shooting image. The first digital processing section 31b performs also the compression and extension processing of the data of the shooting image. The first digital processing section 31b is connected with the system bus 40.

The analyzing-purpose imaging section 32 has a second image pickup device 24, a second analog processing section 32a and a second digital processing section 32b. Incidentally, since the configuration of the analyzing-purpose imaging section 32 corresponds approximately to that of the recording-purpose imaging section 31, the description on the overlap of the two is omitted partially.

The second image pickup device 24 is a sensor for analyzing the condition of a subject within the shooting image plane at a shooting standby time. The second image pickup device 24 performs the photoelectric conversion of the subject image, which is formed after passing through the viewfinder optical system, at every predetermined interval to generate the analog signal of a moving image. The data of the moving image is used for an after-mentioned auto exposure (AE) calculation, face detection processing etc. The output signal of the second image pickup device 24 is input to the second analog processing section 32a.

The second analog processing section 32a is an analog front-end circuit having a CDS circuit, a gain circuit, an A/D conversion circuit etc. The second digital processing section 32b performs a color interpolation processing of the moving image, etc. The data of the moving image output from the second digital processing section 32b is input to the CPU 39.

The memory 33 is a buffer memory for recording temporarily the data of a shooting image in the former-process or post-process of the image processing by the first digital processing section 31b.

For the recording I/F 34, a connector for connecting a recording medium 35 is formed, and the recording I/F 34 performs the writing/reading of the data of the shooting image for the recording medium 35 connected to the connector. The recording medium 35 is constituted of a hard disk, a memory card with a built-in semiconductor memory, or the like. In FIG. 1, a memory card is shown as one example of the recording medium 35.

The displaying I/F 36 controls the display of the monitor 37 on the basis of the instruction from the CPU 39. The monitor 37 displays various images in response to the instruction from the CPU 39 and the displaying I/F 36. The monitor 37 in the first embodiment is constituted of a liquid crystal monitor. On the monitor 37, a reproduced image of the shooting image, a menu screen capable of the input in GUI (Graphical User Interface) format, etc. can be displayed. On the monitor 37, it is also possible to perform the motion display of the condition of the field at a shooting standby time on the basis of the moving image of the analyzing-purpose imaging section 32 (the representation of respective images is omitted).

The operation section 38 has a release button, an operation button, etc. The release button of the operation section 38 accepts the instruction input for starting exposure operation from a user. The operation button of the operation section 38 accepts the input using the menu screen, the switching input of the shooting mode of the electronic camera, etc. from a user.

The CPU 39 controls the operation of the respective sections of the electronic camera, and performs various calculations that become necessary for the shooting. For example, the CPU 39 drives the main mirror 15, mechanical shutter 16, etc. at the shooting. The CPU 39 controls the movement of the focusing lens 13 and aperture 14 of the lens unit 12 via the mount.

The CPU 39 also functions as an AE calculation section 39a, an AF calculation section 39b, and a face detecting section 39c by a program stored in a not shown ROM.

The AE calculation section 39a performs a publicly known AE calculation on the basis of the output from the analyzing-purpose imaging section 32, and determines the shooting conditions (exposure time, f-number, image pickup sensitivity) at the shooting.

The AF calculation section 39b selects the focusing area from the optional areas of the focusing section 19. Then, the AF calculation section 39b calculates the defocus amount of the focus lens (difference amount and difference direction from the focusing position) on the basis of the output from the focusing area in the focusing section 19. The AF calculation section 39b selects the focusing area on the basis of the result of the face detection processing by the face detecting section 39c.

The face detecting section 39c detects the face area and size of the face of a subject from the data of the moving image. For example, the face detecting section 39c extracts the face area by the extraction processing of the characteristic points of the face as described in Japanese Unexamined Patent Application Publication No. 2001-16573, etc. The characteristic points include, for example, respective end points of eyebrows, eyes, nose and lips, profile points of the face, avertex point, and the bottom portion of a chin. Alternatively, as described in Japanese Unexamined Patent Application Publication No. Hei 8-63597, the face detecting section 39c may extract the profile of a flesh color area on the basis of the color information of the subject and, further, matches the same with the template of face parts that is previously prepared, to detect the face.

Figure 5:
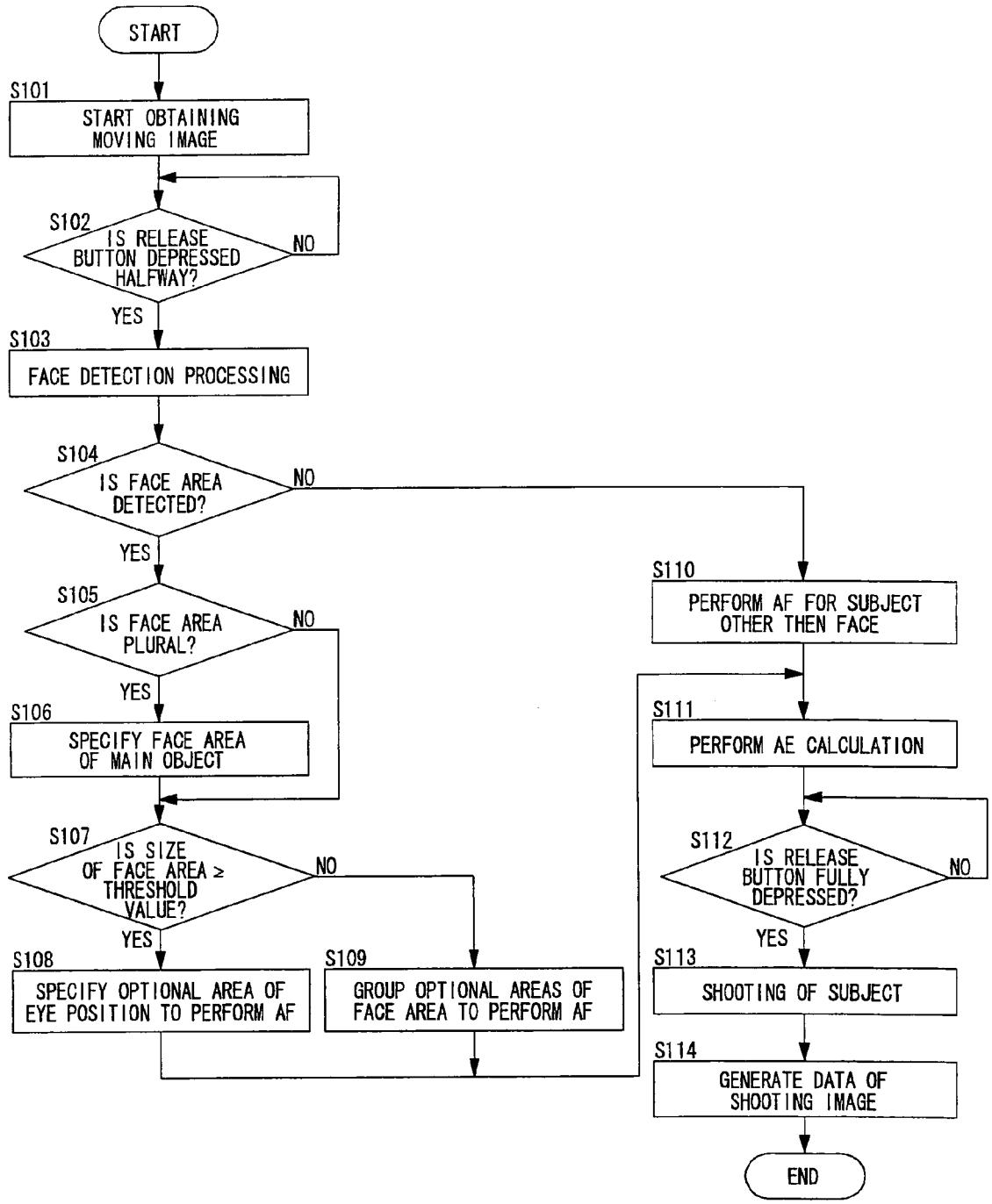
FIG. 5 is a flowchart showing one example of the shooting operation of the electronic camera according to the first embodiment.

Next, with reference to the flowchart in FIG. 5, explains one example of the shooting operation of the electronic camera of the first embodiment. In the following description, it is assumed that the face detection function of the electronic camera has been previously set on, and that a user performs framing with the viewfinder optical system.

Step 101: when the operation section 38 accepts the starting operation of the shooting mode from a user, the CPU 39 instructs to start obtaining the moving image to the analyzing-purpose imaging section 32. The CPU 39 drives the second image pickup device 24 at every predetermined interval and obtains sequentially the moving image. Incidentally, in the step of S101, the main mirror 15 is in the position of an observing state.

Step 102: the CPU 39 determines whether or not the release button has been pressed halfway. In case where the release button is pressed halfway (YES side), the step moves to S103.

In case where no input exists to the release button (NO side), the CPU 39 waits for the halfway depression of the release button.

Step 103: the face detecting section 39c of the CPU 39 gives face detection processing to the data of the moving image to detect the face area within the shooting image plane.

Here, the face detecting section 39c detects the face area within the focusing range of the focusing section 19 for the shooting image plane. Since the face area lying in a range for which the focusing cannot be detected with the focusing section 19 has a low possibility to be a main subject, and no influence on the after-mentioned selection of the focusing area.

Step 104: the CPU 39 determines whether or not the face area has been detected within the focusing range by the face detection processing at S103. In case where the above condition is satisfied (YES side), the step moves to S105. In case where the above condition is not satisfied (NO side), the step moves to S110.

Step 105: the CPU 39 determines whether or not plural face areas have been detected by the face detection processing at S103. In case where plural face areas have been detected (YES side), the step moves to S106. In case where only one face area has been detected (NO side), the step moves to S107. In this case, the CPU 39 treats the detected face area as the main subject.

Step 106: the CPU 39 designates the face area of the main subject from among the plural face areas. Specifically, the CPU 39 designates the face area on the closest side or the face area positioned in the center of the shooting image plane as the main subject. When specifying the face area on the closest side as the main subject, the CPU 39 may presume the face area having the face of the largest size in the moving image to be the face area lying on the closest side and specify the same. Alternatively, the CPU 39 may obtain the face area on the closest side on the basis of the defocus amount having been obtained from respective optional areas of the focusing section 19.

Step 107: the CPU 39 determines whether or not the size of the face area of the main subject is equal to or above the threshold value. In case where it is equal to or above the threshold value (YES side), the step moves to S108. In case where it is less than the threshold value (NO side), the step moves to S109.

Step 108: the CPU 39 designates the optional area corresponding to the eye position in the face area of the main subject as the focusing area. Then, the AF calculation section 39b performs the arithmetic for defocus amount from the focusing area of the eye position, and performs AF. After that, the step moves to S111. Circumstances of specifying the focusing area at S108 are shown schematically in FIG. 6(a).

Because, it is preferred to focus the lens on the eye when shooting a person. In addition, because, when a face area has a certain size or more as is the scene at S108, the possibility of the existence of an optional area corresponding to the eye position is also high.

At S108, the CPU 39 seeks the eye position on the basis of the characteristic point of the face area and specifies the focusing area. In case where the face detection is performed through the detection of flesh color, the CPU 39 may specify the focusing area by presuming the eye position from the profile of the face area. In case where no such optional area exists that overlaps the eye position, the CPU 39 specifies the nearest optional area to the eye position as the focusing area.

In case where two optional areas corresponding to the eye position exist in the face area of the main subject, the CPU 39 specifies further the focusing area according to any one of following methods.

(1) Firstly, the CPU 39 specifies an optional area that lies nearer to the center of the shooting image plane as the focusing area. In this case, the electronic camera can realize the AF that answers general shooting intention of the user.

(2) Secondly, while comparing the outputs of the optional areas corresponding to the eye position, the CPU 39 specifies the optional area in which the subject lies on the closer side as the focusing area. In this case, for example, the electronic camera can realize more suitable AF for such scene as shooting a person-that faces obliquely to the camera.

Figure 6:
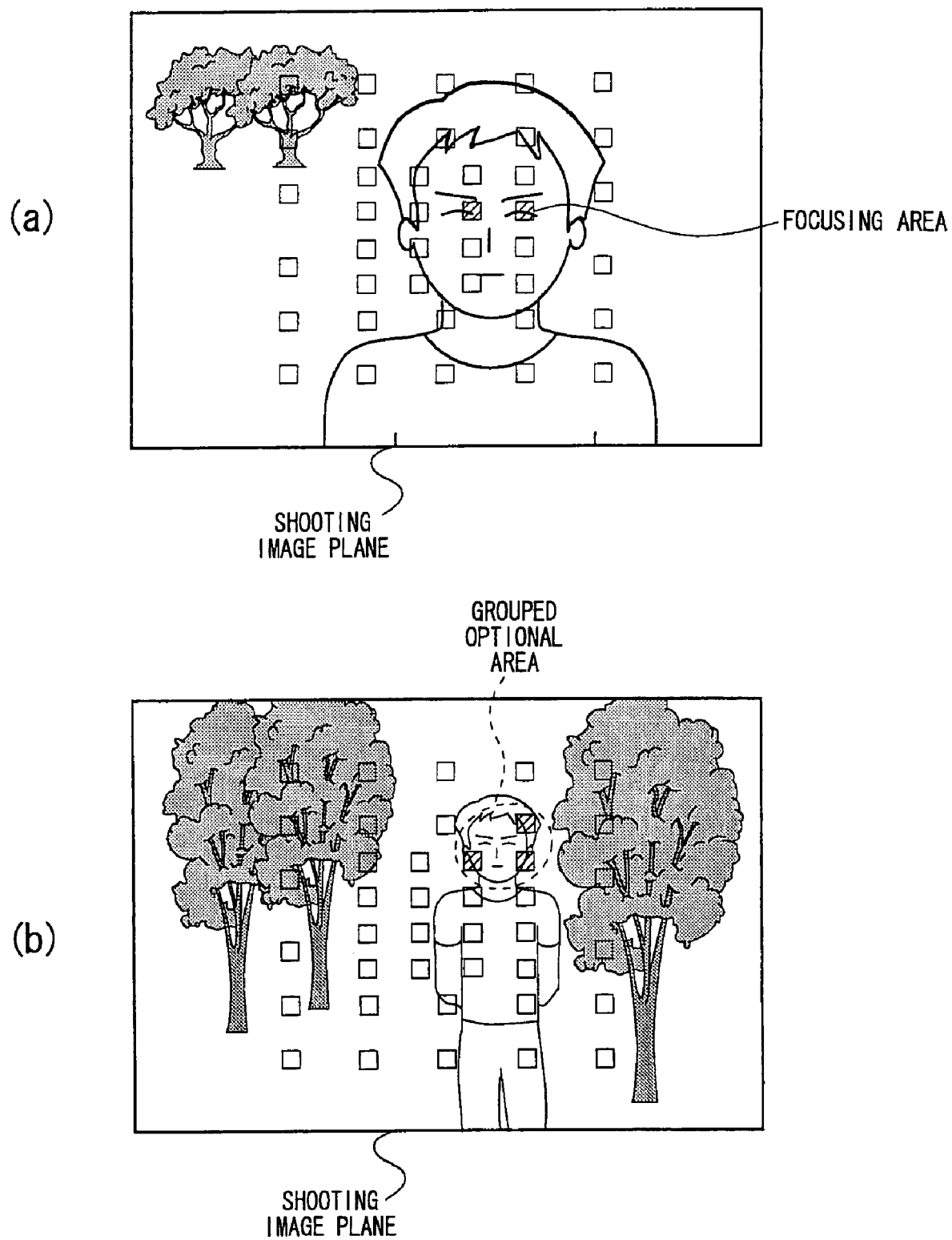
FIG. 6(*a*) is a schematic view showing the condition of the specification of a focusing area at S108, and FIG. 6(*b*) is a schematic view showing the condition of specification of a focusing area at S109.

Step 109: the CPU 39 groups all the optional areas corresponding to the face area of the main subject. Then, the CPU 39 specifies the focusing area from among the grouped optional areas, and the AF calculation section 39b calculates the defocus amount for the focusing area to perform AF. After that, the step moves to S111. Circumstances of the specification of the focusing area at S109 are schematically shown in FIG. 6(b).

In the scene at S109, a person of the main subject is thought to be positioned far. Since the focusing range for a far subject is broad, the necessity for focusing strictly a lens on the eye of the main subject is low. Further, in the scene at S109, such possibility that no optional area corresponding to the eye position exists is high, therefore the CPU 39 specifies the focusing area from the grouped optional areas.

Here, the CPU 39 at S109 specifies the focusing area from among the grouped optional areas according to the following method. For example, the CPU 39 specifies the optional area lying at the center of the face area from among the grouped optional areas as the focusing area. Alternatively, the CPU 39 specifies the optional area in which the subject lies on the closest side from among the grouped optional areas as the focusing area. Incidentally, in the grouping, the CPU 39 may exclude optional areas that overlap partially the face area from the object of the grouping, or, inversely, may include optional areas that overlap partially the face area in the object of the grouping.

Step 110: in this case, the CPU 39 performs AF according to an algorism at ordinary shooting while adopting a subject other than the face as the main subject. For example, the CPU 39 selects the focusing area on the basis of center priority or closest range priority, and performs AF by the AF calculation section 39b.

Step 111: the AE calculation section 39a of the CPU 39 performs the AE calculation on the basis of the moving image and adjusts the shooting conditions.

Here, in case where the face area has been detected at S103, preferably the AE calculation section 39a controls the f-number on the basis of the defocus amount to adjust the depth of field.

Specifically, the AE calculation section 39a obtains respective subject distances from optional areas corresponding to the face area. Then, on the basis of these subject distances, the AE calculation section 39a enlarges the f-number and deepens the depth of field. As the result, it is possible to realize such state that all of the face area is focused, and to avoid such situation that a part of the face is out of focus when one person is shot. Further, it becomes possible to focus a lens on all persons in such scene as shooting plural persons.

Step 112: the CPU 39 determines whether or not the release button has been fully depressed. In case where the release button is fully depressed (YES side), the step moves to S113.

When there is no input at the release button (NO side), the CPU 39 waits for the full depression of the release button.

Step 113: the CPU 39 evacuates the main mirror 15 from the shooting optical path and drives the first image pickup device 17 to shoot the subject image.

Step 114: the CPU 39 instructs the generation of the data of the shooting image to the recording-purpose imaging section 31. Then, the data of the shooting image is finally recorded on the recording medium 35. With these steps, a series of the shooting operation terminates. When the shooting is continued, the CPU 39 returns to S102 and repeats the above operations.

When the electronic camera of the first embodiment detects the face of a person within the focusing range of the focusing section 19, it performs AF according to the phase difference detecting method for the face of the person. Further, the electronic camera of the first embodiment changes the method of selecting the focusing area in accordance with the size of the face of the main subject (S108, S109). Consequently, according to the electronic camera of the first embodiment, it is possible to perform the optimum AF in accordance with the detection state of the face for every scene to be shot.

Description of Second Embodiment

Figure 7:
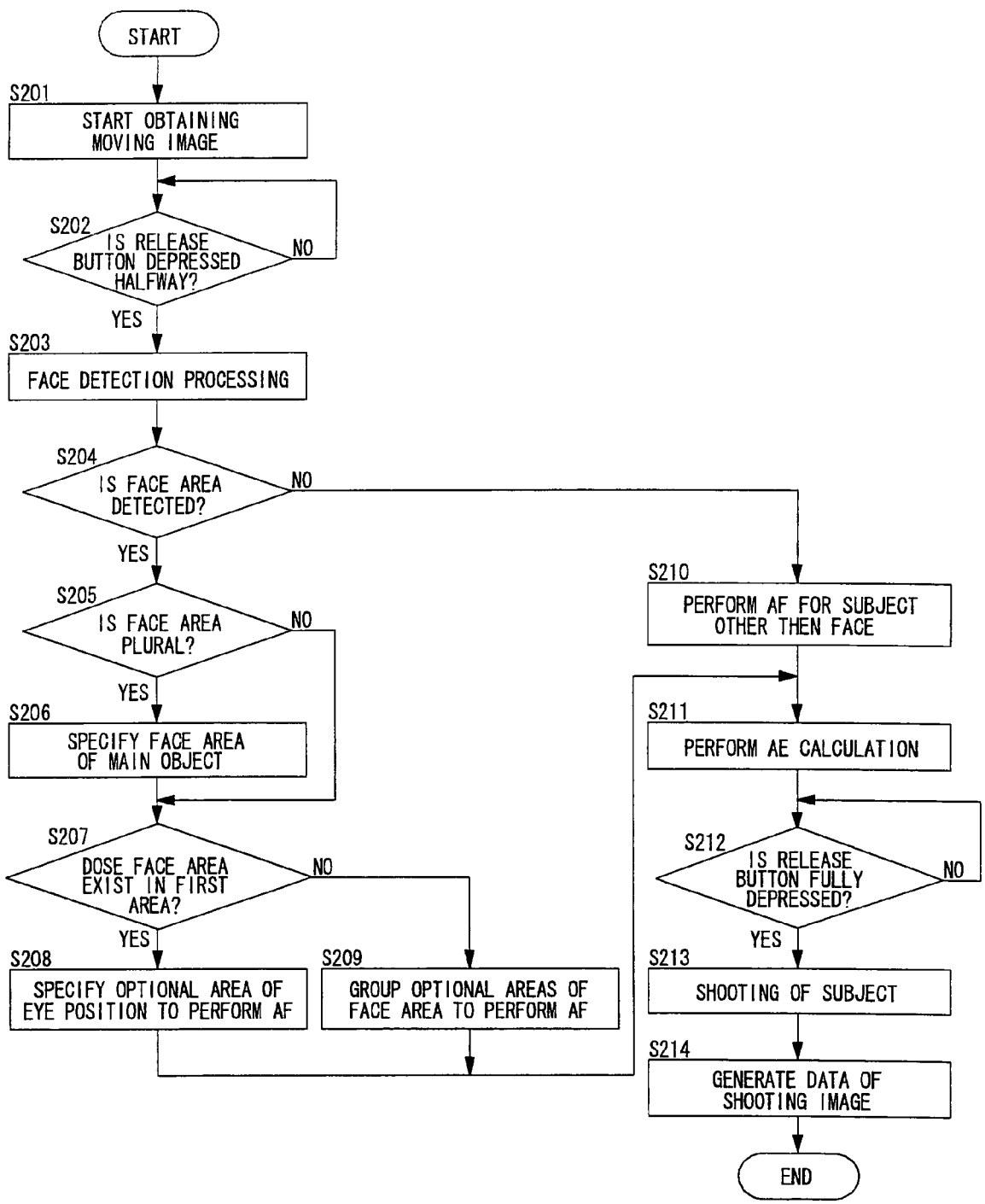
FIG. 7 is a flowchart showing one example of the shooting operation of the electronic camera according to the second embodiment.

FIG. 7 is a flowchart showing an example of the shooting operation of the electronic camera in a second embodiment. Here, since the basic configuration of the electronic camera of the second embodiment is common to that of the first embodiment, repeated description thereon is omitted.

The second embodiment is a modified example of the first embodiment, and S201 to S206 in FIG. 7 correspond to S101 to S106 in the first embodiment, respectively. S210 to S214 in FIG. 7 correspond to S110 to S114 in the first embodiment, respectively. Therefore, repeated description is omitted for the above-described respective Steps as shown in FIG. 7.

Step 207: the CPU 39 determines whether or not the position of the face area of the main subject is in the first area. When the position of the face area of the main subject is in the first area (YES side), the step moves to S208. When the position of the face area of the main subject is in the second area (NO side), the step moves to S209. When the position of the face area straddles on the first area and the second area, the CPU 39 determines that the face area belongs to the area in which a half or more of the face area is included.

Figure 8:
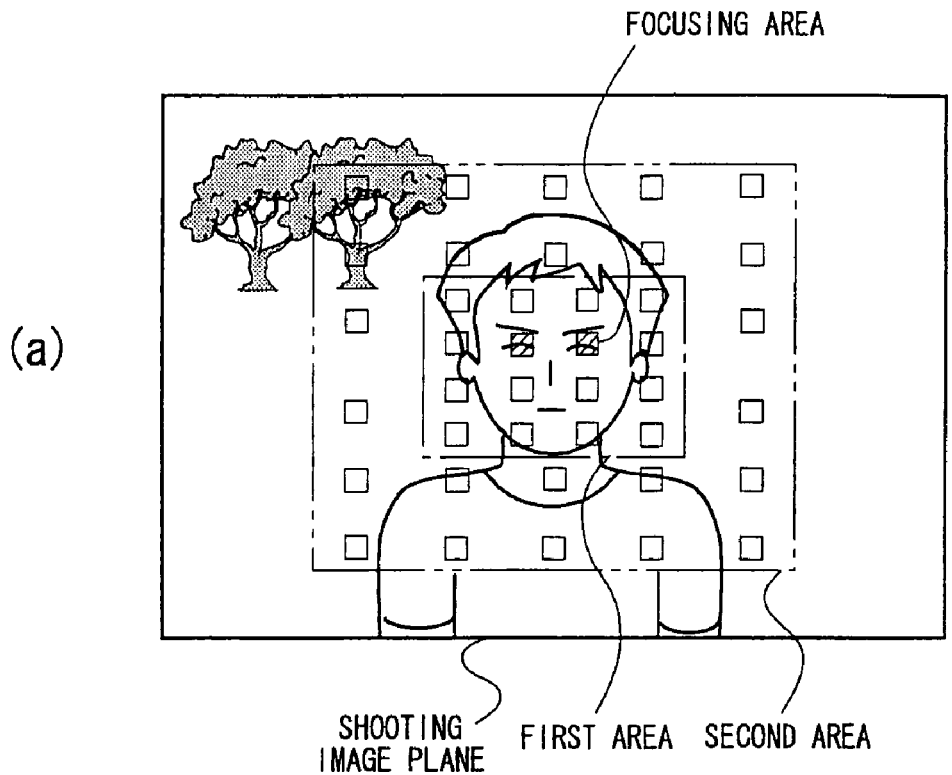
FIG. 8(a) is a schematic view showing the condition of the specification of a focusing area at S208.
FIG. 8(b) is a schematic view showing the condition of the specification of a focusing area at S209.
Figure 8:
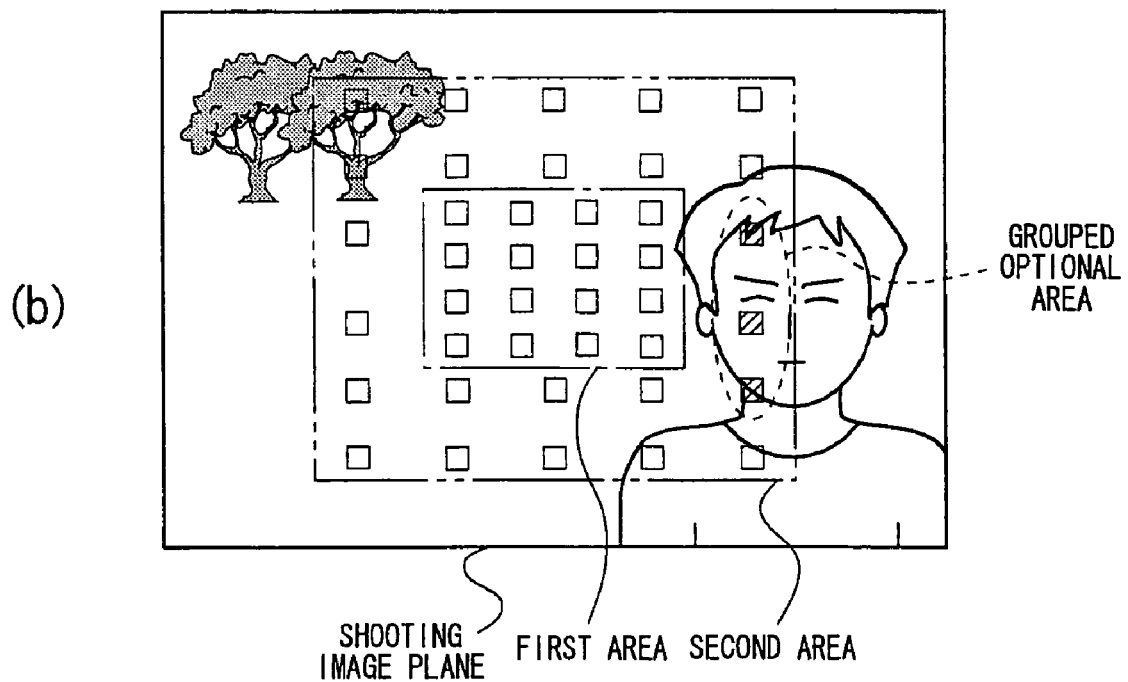

Step 208: the CPU 39 specifies the optional area corresponding to the eye position in the face area of the main subject as the focusing area. Then, the AF calculation section 39b calculates the defocus amount from the focusing area of the eye position to perform AF. After that, the step moves to S211. Circumstances of specifying the focusing area at S208 are shown schematically in FIG. 8(a).

Because, it is preferred to focus the lens on the eye when shooting a person. In addition, in the scene at S208, the face area of the main subject lies in the first area having a high arrangement density of optional areas, therefore the possibility of the existence of an optional area overlapping the eye position is high. Incidentally, the specific method of specifying the optional area at S208 is common to that at S108 in the first embodiment, and the repeated description thereon is omitted.

Step 209: the CPU 39 groups all the optional areas corresponding to the face area of the main subject. Then, the CPU 39 specifies the focusing area from among the grouped optional areas, and the AF calculation section 39b calculates the defocus amount from the focusing area to perform AF.

After that, the step moves to S211. Circumstances of specifying the focusing area at S209 are shown schematically in FIG. 8(b).

In the scene at S209, the face area of the main subject lies in the second area having a low arrangement density of optional areas, therefore the possibility of the existence of an optional area overlapping the eye position is low. Accordingly, it is intended to assure a high focusing accuracy by selecting the focusing area from the group of optional areas corresponding to the face area. Incidentally, the specific method of specifying the optional area at S209 is common to that at S109 in the first embodiment, and the repeated description thereon is omitted.

In the electronic camera of the second embodiment, the method of selecting the focusing area is changed in accordance with the position of the face of the main subject (S208, S209). Consequently, according to the electronic camera of the second embodiment, it is possible to perform the optimum AF in accordance with the picture composition of a scene to be shot and the arrangement of the optional areas.

Supplementary Items for Embodiments (1) In the above embodiments, examples of an electronic camera of a monocular reflex type are described, but the present invention can be also applied to silver salt cameras of a monocular reflex type.

(2) In the above embodiments, the example of performing the face detection processing in accordance with the halfway depression operation of the release button is described, but such a constitution that the CPU performs the face detection processing from the moving image at every constant interval may be adopted.

(3) In the above embodiments, the example of performing a framing with the viewfinder optical system, but such a constitution that the framing is performed by displaying a motion picture on the basis of the moving image on the monitor may be adopted.

(4) The arrangement of the optional areas in the embodiments is absolutely one example of the present invention, and the present invention can be applied naturally to focusing sections 19 having different number or arrangement of optional areas from that of the embodiments.

(5) In the present invention, such a method that the selection of the focusing area is changed according to the combination of the size and the detection position of the face area of the main subject may be adopted. For example, in the first embodiment, when the face area of the main subject is not less than the threshold value but lies in the second area, the CPU 39 may specify the focusing area in the same way as that at S109. Further, in the second embodiment, when the face area of the main subject lies in the first area but has a size less than the threshold value, the CPU 39 may specify the focusing area in the same way as that at S209.

The invention is not limited to the above embodiments and various modifications may be made without departing from the spirit and scope of the invention. Any improvement may be made in part or all of the components.

What is claimed is:

1. A camera, comprising:
   a face detecting section that detects a face area within a shooting image plane;
   a focusing section that includes plural optional areas within said shooting image plane and obtains an image phase difference amount of a pair of images based on luminous flux having passed through a shooting lens in each of said optional areas;

an area specifying section that specifies a focusing area from among said optional areas corresponding to said face area and changes a method of specifying said focusing area in accordance with a size of said face area; and a controlling section that performs a focusing operation of said shooting lens on the basis of said image phase difference amount in said focusing area.

2. The camera according to claim 1, wherein,
when the size of said face area is not less than a threshold value, said area specifying section specifies said optional area corresponding to an eye position of said face area as said focusing area.

3. The camera according to claim 1, wherein,
when the size of said face area is less than a threshold value, said area specifying section groups one or more of said optional areas corresponding to said face area, and specifies said focusing area from among the grouped said optional areas.

4. The camera according to claim 1, further comprising:
a position identifying section that identifies a position where said face area is detected,
wherein said area specifying section changes the method of specifying said focusing area in accordance with the size and a detection position of said face area, the detection position being identified by said position identifying section.

5. The camera according to claim 4, wherein:
said focusing section includes a first area arranged with plural optional areas and a second area having a lower arrangement density of said optional areas than the first area, and
when the size of said face area is not less than a threshold value and said face area is detected in said second area, said area specifying section groups one or more of said optional areas corresponding to said face area and specifies said focusing area from among the grouped said optional areas.

6. A camera, comprising:
a face detecting section that detects a face area within a shooting image plane;
a focusing section that includes a first area arranged with plural optional areas and a second area having a lower arrangement density of said optional areas than the first area within a shooting image plane, and that obtains an image phase difference amount of a pair of images based on luminous flux having passed through a shooting lens in each of said optional areas;
an area specifying section that specifies a focusing area from among said optional areas corresponding to said face area, and that changes a method of specifying said focusing area depending on to which one of said first area and said second area said face area belongs; and
a controlling section that performs a focusing operation of said shooting lens on the basis of said image phase difference amount in said focusing area.

7. The camera according to claim 6, wherein:
said area specifying section, when determining that said face area belongs to said first area, specifies said optional area corresponding to an eye position of said face area in said first area as said focusing area.

8. The camera according to claim 6, wherein:
said area specifying section, when determining that said face area belongs to said second area, groups one or more of said optional areas corresponding to a face area in said second area and specifies said focusing area from among the grouped said optional areas.

9. The camera according to claim 6, wherein:
said area specifying section, when determining that said face area belongs to said first area and a size of said face area is less than a threshold value, groups one or more of said optional areas corresponding to a face area in said first area and specifies said focusing area from among the grouped said optional areas.

* * * * *